(12) United States Patent
Cavalli

(10) Patent No.: US 8,518,477 B2
(45) Date of Patent: Aug. 27, 2013

(54) WATER-BASED ADHESIVE COMPOSITION AND A PROCESS TO FOAM IT

(75) Inventor: Dario Cavalli, Milan (IT)

(73) Assignee: Henkel AG & Co. KGAA, Duesseldorf (DE)

( * ) Notice: Subject to any disclaimer, the term of this patent is extended or adjusted under 35 U.S.C. 154(b) by 0 days.

(21) Appl. No.: 13/307,710

(22) Filed: Nov. 30, 2011

(65) Prior Publication Data

US 2012/0135140 A1 May 31, 2012

Related U.S. Application Data

(63) Continuation of application No. PCT/EP2009/056826, filed on Jun. 3, 2009.

(51) Int. Cl.
*B05D 5/10* (2006.01)
(52) U.S. Cl.
USPC .......................... 427/207.1; 156/78; 156/497
(58) Field of Classification Search
USPC ................. 427/207.1; 156/78, 497
See application file for complete search history.

(56) References Cited

U.S. PATENT DOCUMENTS

| | | | | |
|---|---|---|---|---|
| 4,692,473 A | * | 9/1987 | Wright et al. | 521/72 |
| 6,878,752 B1 | * | 4/2005 | Aubert | 521/78 |
| 2004/0251275 A1 | * | 12/2004 | Sams et al. | 222/145.6 |
| 2005/0045267 A1 | | 3/2005 | Muvundamina | |

FOREIGN PATENT DOCUMENTS

| | | |
|---|---|---|
| DE | 216744 A1 | 12/1984 |
| GB | 887078 A | 1/1962 |
| JP | 2005008683 A | 1/2005 |
| WO | 8606328 A1 | 11/1986 |

* cited by examiner

*Primary Examiner* — Nathan Empie
*Assistant Examiner* — Xiao Zhao
(74) *Attorney, Agent, or Firm* — Sun Lee Lehmann

(57) ABSTRACT

A process to apply a foamable water-based adhesive comprises combining, in a pressure-tight container having an outlet valve, a) a first aqueous polymer having a pH-value above 6 and containing a dissolved or dispersed salt that can liberate a gas, and b) a second aqueous polymer comprising an acid and having a pH-value lower than 5, and combined aqueous releasing the combined aqueous polymers from the pressure-tight container through the outlet valve onto a substrate, whereby gas bubbles are formed in the aqueous polymers leaving the valve, thus foaming the water-based adhesive.

8 Claims, No Drawings

WATER-BASED ADHESIVE COMPOSITION AND A PROCESS TO FOAM IT

CROSS-REFERENCE TO RELATED APPLICATION

This application is a continuation of International Patent Application Serial No. PCT/EP2009/056826 filed Jun. 3, 2009, the contents of which are incorporated herein by reference.

The present invention relates to a water-based adhesive composition, preferably in the form of an aqueous emulsion, and a process to foam said water-base adhesive.

It is known that adhesives should only be applied in a certain thin layer onto the surfaces to be fixed, in order to achieve appropriate adhesion. The use of the adhesives in a least possible quantity is advantageous from all points of view, since the use of less adhesive is more economic, the adhesive dries faster, the weight of the objects adhered together is smaller, as well as it is also advantageous from environmental point of view. However, the machine used for this process are not generally able to apply such a thin layer that would be sufficient for an appropriate quality of adhesion in a continuous and reliable manner, which means, more adhesive is used than it would be necessary. For example, at laminating, a thickness of layer of about 30-60 microns would be sufficient, though, the inaccuracy of the machinery is usually higher by one or two orders of magnitude. In order to reduce the quantity of the adhesive used, the machine manufacturers create even more and more precise and, thus, expensive machineries, while producers of adhesives increase the extract content of the adhesives. Furthermore, the absorption of the adhesive emulsion on porous substrates like paper can be advantageously calibrated by the degree of foaming.

The main adhesive users apply a foaming apparatus to solve the problem described, in case of which compressed gas, usually air, is conducted into the adhesive by a special technique. By means of this method the quantity of the effective adhesive can be decreased since a significant proportion of the foamed material applied is gas. One such method is described in the specification of GB 887078 wherein the foaming is achieved in such a manner that the adhesive is vigorously mixed with gas, e.g. nitrogen or air or freon for 10-30 minutes, that is, by means of a "whisking" method, which, on the one hand, necessitates a complicated machinery, and, on the other hand, requires that the conditions of the foaming have to be provided, e.g. by means of adjusting the viscosity, as well as using a foam stabilizing agent, moreover, the apparatus has to be furnished with precise flow control. Since such solutions are complicated and require expensive machinery, they are profitable only in case of using several hundred tons of adhesive per year.

The aim of the invention is to provide a solution for foaming adhesives which can be profitable also in case of using a smaller quantity of adhesive, that is, which does not require any expensive machinery, which can be implemented in a simple way, and at the same time good results can be achieved by it while reducing the necessary amount of adhesive.

WO 86/06328 discloses methods to foam water borne polymer solutions or dispersions. In this process, a salt, preferably a carbonate, is added to the polymer solution or emulsion which generates a gas, especially carbon dioxide, when an acid is added to it. This process leads to an instantaneous foaming as soon as the acid is added to the mixture. Thus, the foaming process cannot be controlled very well.

The present invention is different from this process by first generating in-situ dissolved gas in the polymer solution or emulsion under pressure, so that no or only limited foaming occurs during this step. Foaming occurs only when the pressure is released in a second step in a controlled manner.

In a general aspect, the process of the present invention can be described as follows:

A process to apply a foamable water-based adhesive which is an aqueous polymer solution or dispersion, characterised in that a) a first aqueous polymer solution or dispersion that has a pH-value above 6 and that contains a dissolved or dispersed salt that liberates a gas when it is combined at a pressure of 1.01 bar (1 atm) with an acidic solution with a pH-value of lower than 5 is provided in a first container, b) a second aqueous polymer solution or dispersion that comprises an acid and that has a pH-value of lower than 5 is provided in a second container, c) the first and the second aqueous polymer solution or dispersion are combined in a pressure-tight container having an outlet valve, d) the combined aqueous polymer solution or dispersion, which forms the water-based adhesive, is released from the pressure-tight container through the outlet valve onto a substrate at a pressure lower than the pressure within the first container, whereby the gas liberated from the dissolved or dispersed salt during and after step c) forms gas bubbles in the aqueous polymer solution or dispersion leaving the valve, thus foaming the aqueous polymer solution or dispersion.

A first embodiment of this process is as follows:

a) A first aqueous polymer solution or dispersion that has a pH-value above 6 and that contains a dissolved or dispersed salt, that liberates a gas when it is combined at a pressure of 1.01 bar (1 atm) with an acidic solution with a pH-value of lower than 5 is provided in a first and pressure-tight container that is equipped with an inlet valve and an outlet valve, b) a second aqueous polymer solution or dispersion that comprises an acid and that has a pH-value of lower than 5 is provided in a second container that is equipped with an inlet valve and an outlet valve, c) the second container is connected via its outlet valve with the inlet valve of the first container, a pressure is provided at the inlet valve of the second container that is equal to or higher than the pressure within the first container, and the second aqueous polymer solution or dispersion is at least partially transferred into the first container containing the first aqueous polymer solution or dispersion through the inlet valve of the first container, which has the function of the pressure-tight container mentioned above, d) the combined aqueous polymer solution or dispersion in the first container, which forms the water-based adhesive, is released from the first container through the outlet valve onto a substrate at a pressure lower than the pressure within the first container, whereby the gas liberated from the dissolved or dispersed salt during and after step d) forms gas bubbles in the aqueous polymer solution or dispersion leaving the valve, thus foaming the aqueous polymer solution or dispersion, It is evident that in this embodiment the "first" and the "second" container can be interchanged. The invention is not changed if the first aqueous polymer solution or dispersion is stored in the second container, and is added to the second polymer solution or dispersion contained in the first pressure tight container.

Alternatively, the process can be carried out in a second embodiment as follows:

In step c) the first and the second aqueous polymer solution or dispersion are taken from their respective containers and are combined through a static mixer and fed into a third, pressure-tight container having an outlet valve. This can be done, e.g., by gravity, by the action of an applied pressure (e.g. compressed air or another compressed gas), or, and preferably, by the action of pumps which press the contents of the first and the second container through the static mixer into a third and pressure-tight container. The pressure within the pressure-tight container must be overcome in order to do so.

d) The combined aqueous polymer solution or dispersion, which forms the water-based adhesive, is released from the pressure-tight container through the outlet valve onto a substrate at a pressure lower than the pressure within the first container, whereby the gas liberated from the dissolved or dispersed salt during and after step c) forms gas bubbles in the aqueous polymer solution or dispersion leaving the valve, thus foaming the aqueous polymer solution or dispersion.

The latter process can be carried out batch-wise: The pressure-tight container is at least partially filled with the combined aqueous polymer solution or dispersion, and the adhesive is removed as required. Alternatively, this process can be carried out continuously: As the adhesive is removed from the pressure-tight container, new first and second aqueous polymer solution or dispersion is fed into the pressure-tight container through the static mixer.

In any embodiment, it is preferred that the outlet valve of the pressure-tight container is of the "no-return" type, and is preferably a pneumatic valve.

The formulation " . . . which liberates a gas when it is combined at a pressure of 1.01 bar (1 atm)" means that the salt reacts with an acid to liberate a substance that is a gas at atmospheric pressure (1.01 bar) and room temperature (22° C.). This gas can be at least partially dissolved in water at this pressure or at a pressure above this value. This is indeed the case in the process of the present invention: The evolution of the gas increases the pressure within the pressure-tight container, and is partially dissolved in the water at the pressure generated within the container. In step d) of the process the pressure is released when the emulsion is applied to a substrate outside the container, so that the dissolved gas forms gas bubbles in the emulsion, thus foaming the emulsion. Usually, the substrate will be at ambient pressure, which is lower than the pressure within the first container. "Ambient" pressure" is the atmospheric pressure at the place and at the time where and when the water based adhesive is applied. This pressure varies according to the altitude of the application side, and according to weather conditions.

So, the principle of this invention consists in dissolving a gas in the water-based adhesive under pressure. The pressure is maintained, so that the solution of the gas in the adhesive remains stable, until the adhesive is allowed to leave the pressurized container through a valve. Leaving the valve, the water-based adhesive with the dissolved gas comes under ambient pressure. The solution of the gas becomes unstable under the reduced pressure, so that it forms gas bubbles within the water-based adhesive, transforming the water-based adhesive into foam. The degree of foaming is easily controlled by the composition of the formulation (more or less salt and/or acid, addition of foam regulators), by adjusting the pressure difference between the pressure inside the container and atmospheric pressure, and by controlling the size of the aperture of the valve. Thus, the foamed adhesive can be applied onto the substrate in a very controlled fashion, and the need to apply more adhesive than necessary for reasons of safety is considerably reduced.

During and after process step c), the pressure in the pressure-tight container increases due to the reaction of the salt with the acid, until equilibrium pressure between the gas phase in the container and the amount of gas dissolved in the aqueous phase is reached. The equilibrium pressure additionally depends on the temperature (usually ambient temperature, i.e. between 15 and 30° C.). Preferably, the gas pressure over the aqueous polymer solution or dispersion in the pressure-tight container after step c) at 22° C. is at least by 20,265 kPa (0.2 atm), preferably by at least 60 kPa (0.59 atm) higher than the ambient pressure.

In order to transfer at least partially the second aqueous polymer solution or dispersion according to the first embodiment into the first container containing the first aqueous polymer solution or dispersion, it is preferable that the pressure in the second container is not lower, and preferably is higher, than the pressure in the first container. Therefore, pressure should be applied to the second container through its inlet valve. This may be done by connecting a source of pressurized gas (e.g. air, nitrogen, carbon dioxide) with the inlet valve of the second container.

In any embodiment, in order to prevent that gas is released in a considerable quantity before its due time, that is, in order to keep the created gas, especially the carbon dioxide gas, possibly entirely in an absorbed state within the liquid phase, it is preferable to set the (total) pressure of the gas contacting the aqueous polymer solution or emulsion in the pressure-tight container at least on an overpressure (=pressure difference to ambient pressure) of 60 kPa (about 0.59 atm), with the presumption of room temperature (22° C.), before adding of the second aqueous polymer solution or emulsion from the second container. Then it will be held at this pressure. Thus, the gas, preferably the carbon dioxide gas generated as a result of the chemical reaction, will be divided entirely between the vapour phase and the liquid phase in a dissolved state essentially or completely without any phase transformation within the liquid, that is, essentially or completely without any formation of bubbles.

According to the invention, with mixing and adjusting the appropriate pressure, the size of the generated gas bubbles is ideal, the average size is under 200-250 microns, and, according to the invention a saving of adhesive of about 20-40% can be reached.

The salt is preferably selected such that the liberated gas has the following properties: Its solubility in water at 20° C. increases by at least 30%, preferably by at least 50%, more preferably by at least 75%, if the gas pressure is increased from 101,325 kPa (1 atm) to 202,65 kPa (2 atm). In the following description, the term "gas" is sometimes replaced by "gaseous substance". The meaning is the same.

It is especially preferred that carbon dioxide is used as the gaseous substance for practising the present invention. It fulfils the solubility criteria of the present invention, and it can easily be generated directly in the aqueous phase of the water-based adhesive in the process step c). It is non-toxic. Only sufficient ventilation has to be cared for when the foamed adhesive is applied.

The dissolved or dispersed salt in the first aqueous polymer solution or emulsion is preferably a metal carbonate or an ammonium carbonate, or corresponding hydrogen carbonates, or a mixture of different carbonates and/or hydrogen carbonates. Alkaline earth metal carbonates are preferred, especially calcium carbonate. The salt may simultaneously have the function of a "filler" in the water-based adhesive. Or, in a different view, fillers in the adhesive may be chosen in a way that they simultaneously have the function of the salt according to this invention. If a salt like calcium carbonate is used, which is only sparingly soluble in water, it is preferably added as a fine powder with an average particle size, as measured by light scattering methods, of below 100 μm, preferably of below 5 μm.

The acid can be an acidic inorganic salt like, for example, sodium hydrogen sulfate, or an inorganic acid like hydrochloric acid, sulphuric acid, nitric acid, or other acids, as long as the acid or the acidic salt is soluble enough in water to be able to react with the salt in the first aqueous polymer solution or dispersion.

Alternatively, one or more organic acids may be used, preferably acids having from one to six carboxylic acid groups if the acid is not a polymer. Polymeric acids, like polymers or copolymers containing, e.g., acrylic acid, methacrylic acid, maleic acid, fumaric acid and/or other unsaturated acids contain more carboxylic acid groups per polymeric molecule. Preferably, the organic acid is solid in pure form at 22° C. Preferred organic acids are di- or polybasic acids like oxalic acid, citric acid, lactic acid or tartaric acid. The advantage of these acids is two-fold: They do not smell significantly, and their anions have complexing (chelating) properties with respect to calcium ions.

Preferably, the type of acid and its amount in the second aqueous polymer solution or emulsion is selected such that the pH value of this aqueous polymer solution or emulsion is in the range of 1 to 4.

In a preferred embodiment, the polymer comprised in at least one of the first and the second aqueous polymer solution or dispersion is selected from the group consisting of the following types of polymers:
a) homo or co-polymers of vinyl acetate, especially polyvinyl acetate, or a copolymer of vinyl acetate and one or two co-monomer(s) selected from ethylene and esters of maleic acid, preferably dibutylester of maleic acid,
b) polymers or co-polymers of one or more unsaturated organic acid(s) or salts or esters thereof, e.g. selected from the group consisting of (meth)acrylic acid, fumaric acid, maleic acid,
c) polyvinyl alcohol,
d) starch or dextrin-based natural polymers.
(where each of the sections a) to d) above refers to one "type of polymer").

More than one type of polymer can be present in the first and/or the second aqueous polymer solution or dispersion. E.g. one or both of these aqueous polymer solutions or dispersions may contain homo- or co-polymers of vinyl acetate together with polyvinyl alcohol, or together with another type of polymer listed above. Polymers or co-polymers of unsaturated organic acid(s) (b) may simultaneously act as the "acid" in the second aqueous polymer solution or dispersion.

Preferably, the first and the second aqueous polymer solution or dispersion have at least one type of polymer in common. For Example, both aqueous polymer solutions or dispersions may contain homo- or co-polymers of vinyl acetate, or both may contain polyvinyl alcohol, or any other type of polymer listed above, alone or in combination with another type of polymer listed above. Preferably, both contain polyvinyl acetate. Having one type of polymer in common does not necessarily mean that the polymers are identical, but that they belong to the same type as defined above.

According to a preferred embodiment the non-volatile content (=solid content) of each of the first and the second aqueous polymer solution or dispersion is 30-70% by weight, preferably from 40 to 60% by weight, referred to the total weight of the aqueous polymer solution or dispersion. The "non-volatile content" means here the solid remaining after drying the aqueous polymer solution or dispersion under ambient pressure at 110° C., until there is no further weight loss on continued drying. Of course, the "volatile" here is mainly water.

The preferred mixing ratio of the first and the second aqueous polymer solution or dispersion depends of the respective composition, or vice versa. For practical reasons it is preferred that the composition of each aqueous polymer solution or dispersion is adjusted in a way that the weight ratio of the first and the second aqueous polymer solution or dispersion combined in step d) is in the range of 10:1 to 1:10. Ratios between 4:1 to 1:4, and especially between 2:1 and 1:2, are preferred.

The polymer content of each aqueous polymer solution or dispersion, especially the content of homo or co-polymers of vinyl acetate or of polymers or co-polymers of acrylate or acrylic acid or esters thereof, is important for the curing or drying behaviour of the water based adhesive. Preferably, the polymer content is in the range of from 15 to 70% by weight of the total aqueous polymer solution or dispersion.

The preferred salt content in the first aqueous polymer solution or dispersion, and the preferred acid content in the second aqueous polymer solution or dispersion depend on the desired foaming behaviour during application of the water based adhesive. The molar ratio of salt and acid in the two aqueous polymer solutions or dispersions may be chosen in a way that there are two moles of acidic groups in the acid per mole of carbonate ions in the salt, if the salt is a carbonate. For other salts, the stochiometric ratio may be calculated accordingly. If the salt is not only used for the purpose of generating gas, but also for the purpose of a filler in the final water based adhesive, a corresponding excess of salt over its stochiometric relation to the acid should be used. In this way, there is an amount of salt left after the acid has been consumed completely.

If calcium carbonate is used as the salt in the first aqueous polymer solution or dispersion, its amount is preferably from 5 to 40% by weight, more preferably from 10 to 30% by weight with respect to the total first aqueous polymer solution or dispersion.

The amount of acid in the second aqueous polymer solution or dispersion depends from the intended mixing ratio with the first aqueous polymer solution or dispersion, and from the amount of salt in the first aqueous polymer solution or dispersion. The higher the content of salt and acid, the more gas bubbles will be formed during the application of the water based adhesive. As a practical guideline: If the calcium carbonate content in the first aqueous polymer solution or dispersion is in the range of the previous paragraph, and if the acid in the second aqueous polymer solution or dispersion is citric acid, the acid content preferably is from 0.5 to 4% by weight of the total second aqueous polymer solution or dispersion, if a mixing ratio (first to second aqueous polymer solution or dispersion) in the range of 2:1 to 1:1 is intended. For an intended mixing ratio in the range of 6:1 to 5:1, the acetic acid content in the second aqueous polymer solution or dispersion is preferably in the range of 4 to 15% by weight, more preferably 5 to 10% by weight, with respect to the total second aqueous polymer solution or dispersion. For other salts and acids, the corresponding preferred concentrations of salt and acid can be calculated with the aid of stochiometry.

It is evident that the first and the second aqueous polymer solution or dispersion may comprise other components, the type and amount of which are typical for water based adhesives in form of an aqueous polymer solution or dispersion. Examples are: Other complexing agents than the acid, e.g. oligo- or polyphosphate salts like hexametaphosphate salts, preservatives, foam stabilizers, (additional) fillers, triacetine, colorants, rheology control agents like silica, and others.

The adhesive foamed by the process according to the invention is preferably utilized to fix surfaces (i.e. to bond them together), Preferably, at least one of the surfaces is water-absorbing or at least wettable by water, e.g. for the adhesion of paper to paper, wood to wood, paper to synthetic film, wood to metal, and the like. However, the present invention may also be used to bond hydrophobic surfaces, if the drying conditions for the water-based adhesive are adequately controlled.

In a further aspect, the present invention comprises the two-component water-based adhesive which can be used in the process described above. Thus, the present invention also comprises a two-component foamable water-based adhesive, which is an aqueous polymer solution or dispersion, characterised in that
a) the first component is an aqueous polymer solution or dispersion which has a pH-value above 6 and which contains a dissolved or dispersed salt, which liberates a gas when it is combined at a pressure of 1.01 bar (1 atm) with an acidic solution with a pH-value of lower than 5, and
b) the second component is an aqueous polymer solution or dispersion which comprises an acid and which has a pH-value of lower than 5.

The preferred composition of the two aqueous polymer solutions or dispersions which can be used in the process of the present invention has been described in detail further above in connection with the process of the present invention. The same details apply to the two-component foamable water-based adhesive of the present invention itself, so that these details need not to be repeated here in connection with the two-component water-based adhesive.

EXAMPLES

The following formulations can be used in the present invention. The composition is given in % by weight relative to the total composition.

Example of a first aqueous polymer solution or dispersion

| | |
|---|---|
| Calcium carbonate | 22% |
| Polyvinylacetate emulsion (50% solids) | 47% |
| Polyvinylalcohol solution (60% solids) | 8% |
| Preservative | 0.2% |
| Water: Rest to 100% | |
| pH | 7 |

First Example of a second aqueous polymer solution or emulsion:

| | |
|---|---|
| Polyvinylacetate emulsion (60% solids) | 80% |
| Triacetine | 1% |
| Citric acid | 1.6% |
| Preservative | 0.2% |
| Water: Rest to 100% | |
| pH | 2.5-3.0 |

This second aqueous polymer solution or emulsion is mixed with the first one in a weight ration first to second=1:1 to 2:1

Second Example of a second aqueous polymer solution or emulsion:

| | |
|---|---|
| Polyvinylacetate emulsion (60% solids) | 72% |
| Triacetine | 5% |
| Citric acid | 7% |
| Preservative | 0.2% |
| Water: Rest to 100% | |
| pH | 1.5-2.5 |

This second aqueous polymer solution or emulsion is mixed with the first one in a weight ration first to second=5:1 to 6:1

The invention claimed is:

1. A process to apply a foamable water-based adhesive, which is an aqueous polymer solution or dispersion, comprising:
   a) providing a first aqueous polymer solution or dispersion that has a pH-value above 6 and that contains a dissolved or dispersed salt that liberates a gas when it is combined at a pressure of 1.01 bar (1 atm) with an acidic solution with a pH-value of lower than 5, this first solution being contained at a pressure higher than ambient pressure by about 0.59 atm (60 kPa) when the ambient temperature is 22° C.,
   b) providing a second aqueous polymer solution or dispersion that comprises an acid and that has a pH-value of lower than 5, this second solution being contained at a pressure higher than the pressure at which the first solution is contained,
   c) combining and containing at least partially, the first and the second aqueous polymer solutions or dispersions at a pressure at least 0.59 atm (60 kPa) higher than ambient pressure when the ambient temperature is 22° C.,
   d) releasing the combined aqueous polymer solutions or dispersions, which form the water-based adhesive, onto a substrate at a pressure lower than the pressure at which the combined first and second aqueous polymer solutions or dispersions are contained, whereby a gas liberated from the dissolved or dispersed salt during and after step c) forms gas bubbles in the combined aqueous polymer solutions or dispersions, thus foaming the aqueous polymer solution or dispersion.

2. The process according to claim 1, characterized in that the gas liberated from the dissolved or dispersed salt during and after step c) is carbon dioxide.

3. The process according to claim 2 characterised in that the dissolved or dispersed salt in the first aqueous polymer solution or dispersion is a metal or ammonium carbonate.

4. The process according to claim 1 characterised in that the pH value of the second aqueous polymer solution or dispersion, before executing step c), is in the range of 1 to 4.

5. The process according to claim 1 characterised in that the polymer in at least one of the first and the second aqueous polymer solutions or dispersions is selected from the group consisting of the following types of polymers:
   a) homo or co-polymers of vinyl acetate,
   b) polymers or co-polymers of one or more unsaturated organic acid(s) or salts or esters thereof,
   c) polyvinyl alcohol, and
   d) starch or dextrin-based natural polymers.

6. The process according to claim 5 characterised in that the first and the second aqueous polymer solutions or dispersions have at least one type of polymer in common.

7. The process according to claim 1 characterised in that the solid content of the first and the second aqueous polymer solutions or dispersions is from 30 to 70% by weight.

8. The process according to claim 1 characterised in that the weight ratio of the first and the second aqueous polymer solutions or dispersions combined in step c) is in the range of 10:1 to 1:10.

* * * * *